(12) United States Patent
Connell

(10) Patent No.: US 9,656,614 B2
(45) Date of Patent: May 23, 2017

(54) TRIM ASSEMBLIES FOR MOUNTING WORKING SUBASSEMBLIES

(71) Applicant: Toyota Motor Engineering & Manufacturing North America, Inc., Erlanger, KY (US)

(72) Inventor: Eric J. Connell, Dexter, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/918,194

(22) Filed: Oct. 20, 2015

(65) Prior Publication Data

US 2017/0106812 A1 Apr. 20, 2017

(51) Int. Cl.
| | | |
|---|---|---|
| *B60J 7/00* | (2006.01) | |
| *B60R 13/02* | (2006.01) | |
| *B60J 3/02* | (2006.01) | |
| *B60R 11/00* | (2006.01) | |

(52) U.S. Cl.
CPC ......... *B60R 13/0243* (2013.01); *B60J 3/0286* (2013.01); *B60R 11/00* (2013.01); *B60R 13/025* (2013.01); *B60R 13/0206* (2013.01); *B60R 2011/0057* (2013.01); *B60R 2011/0063* (2013.01); *B60R 2013/0287* (2013.01)

(58) Field of Classification Search
CPC . B60R 13/0243; B60R 11/00; B60R 13/0206; B60R 13/025; B60R 2011/0057; B60R 2011/0063; B60R 2013/0287; B60J 3/0286
See application file for complete search history.

(56) References Cited

U.S. PATENT DOCUMENTS

| | | | |
|---|---|---|---|
| 3,042,111 | A | 7/1962 | Wytovich |
| 4,603,563 | A | 8/1986 | Mochida et al. |
| 4,999,951 | A | 3/1991 | Keys et al. |
| 8,287,034 | B2 | 10/2012 | Smith et al. |
| 8,365,799 | B2 | 2/2013 | Harris |
| 8,398,155 | B2 | 3/2013 | Andochick |
| 8,556,328 | B1 | 10/2013 | Middleton |
| 8,615,852 | B2 | 12/2013 | Smith et al. |
| 8,876,200 | B2 | 11/2014 | Huelke et al. |

FOREIGN PATENT DOCUMENTS

| | | |
|---|---|---|
| DE | 102004045522 A1 | 3/2006 |
| WO | 2015/057241 A1 | 4/2015 |

*Primary Examiner* — Lori L Lyjak
(74) *Attorney, Agent, or Firm* — Dinsmore & Shohl LLP

(57) ABSTRACT

A trim assembly includes a first trim portion spaced apart from an opposed second trim portion, a first surface on the first trim portion, a first magnet connected to the first trim portion so as to be hidden when the user views the first surface and a second surface on the first trim portion, a second magnet connected to the second trim portion so as to be hidden when the user views the second surface. When the working subassembly is configured to span between the first trim portion and the second trim portion, the working subassembly magnetically connectable through the first and second surfaces to the respective first and second magnets.

20 Claims, 6 Drawing Sheets

TRIM ASSEMBLIES FOR MOUNTING WORKING SUBASSEMBLIES

TECHNICAL FIELD

The present specification relates generally to trim assemblies for vehicles and, more specifically, trim assemblies for mounting working subassemblies thereto.

BACKGROUND

Sun shades within vehicles to cover a vehicle window are known. These sun shades are typically in a roll-up configuration where the sun shade is partially mounted within a trim assembly. However, if the shades become damaged they cannot be replaced by the user. Additionally, the current sun shades provided within current vehicles cannot be customized in accordance with the user's preferences. Furthermore, existing sun shade assembly connections do not allow for connection with other working subassemblies.

Accordingly, a need exists for alternative trim assemblies for mounting a wide variety of working subassemblies.

SUMMARY

In one embodiment, a trim assembly includes a first trim portion spaced apart from an opposed second trim portion, a first surface on the first trim portion, a first magnet connected to the first trim portion so as to be hidden when the user views the first surface and a second surface on the first trim portion, a second magnet connected to the second trim portion so as to be hidden when the user views the second surface. When the working subassembly is configured to span between the first trim portion and the second trim portion, the working subassembly magnetically connectable through the first and second surfaces to the respective first and second magnets.

In another embodiment, a trim assembly configured to mount a working subassembly, the trim assembly including a trim portion having an outer surface, a magnet or a ferrous metal component connected to the trim portion so as to be hidden when the user views the outer surface. The working subassembly is magnetically connectable through the outer surface to the other of the magnet or the ferrous metal component thereby mounting the working subassembly to the trim portion.

In yet another embodiment, a trim assembly configured to mount a working subassembly and includes a first trim portion spaced apart from an opposed second trim portion, a first surface on the first trim portion, a first ferrous metal component connected to the first trim portion so as to be hidden when the user views the first surface and a second surface on the first trim portion, a second first ferrous metal component connected to the second trim portion so as to be hidden when the user views the second surface. When the working subassembly is configured to span between the first trim portion and the second trim portion, the working subassembly magnetically connectable through the first and second surfaces to the respective first and second first ferrous metal components.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
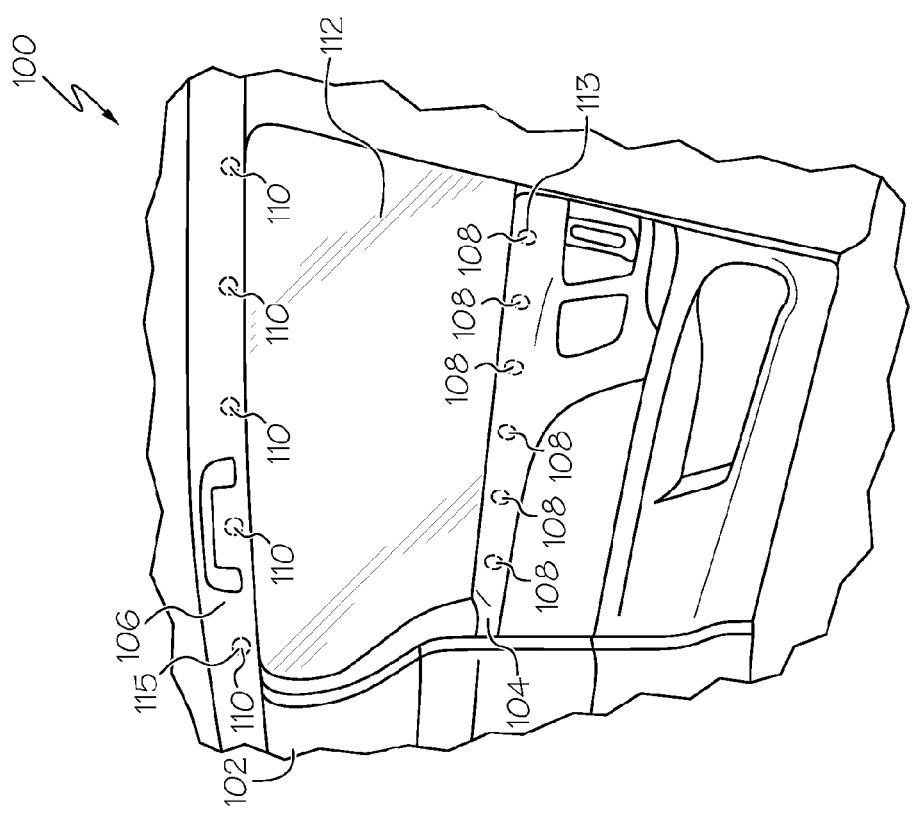
FIG. 1 depicts a perspective view of a trim assembly according to one or more embodiments shown and described herein.

FIG. 1 generally depicts one embodiment of a trim assembly having a plurality of magnets mounted thereon to facilitate mounting of a working subassembly thereto. The trim assembly generally includes a first trim portion and a second trim portion with a window spacing apart the first trim portion from the second trim portion. A plurality of magnets, or ferrous metal components, are mounted to both the first trim portion and the second trim portion. The magnets are mounted out of view from the user. The magnets are mounted on a surface of the trim portions not viewable to the user (or mounted within the trim portions). A user is then capable of mounting a working subassembly to the plurality of magnets on the first trim portion and the second trim portion. Various embodiments of the trim assembly and the operations of the trim assembly will be discussed in more detail herein.

Referring now to FIG. 1, a trim assembly 100 is shown within a vehicle 102. The trim assembly 100 includes a first trim portion 104 spaced apart from a second trim portion 106. The first trim portion 104 includes a first surface 104A and an opposing second surface 104B. The first surface 104A is an outer surface and is viewable by the user within the vehicle. The second surface 104B is an inner surface not viewable to the user. The first trim portion 104 includes a plurality of magnets 108. In alternative embodiments, the magnets 108 may be ferrous metal components instead of magnets.

The trim assembly 100 includes the second trim portion 106 spaced apart from the first trim portion 104. The second trim portion 106 includes a first surface 106A and an opposing second surface 106B. The first surface 106A is an outer surface and is viewable by the user within the vehicle. The second surface 106B is an inner surface and not viewable by the user. The second trim portion 106 includes a plurality of magnets 110. In alternative embodiments, the magnets 110 may be ferrous metal components instead of magnets.

The magnets 108, 110 may include corresponding indicia 113, 115 to indicate to the user where the magnets are located. The indicia 113, 115 may be an ink marking, recessed, protruding portion, etching in the trim portion or other suitable distinguishing feature. In the present embodiment, the indicia 113, 115 mimics the size and dimension of the ferrous metal components of the working subassembly. In other embodiments, the indicia 113, 115 may simply be a dot or other small indicator to help facilitate the connection.

Figure 2:
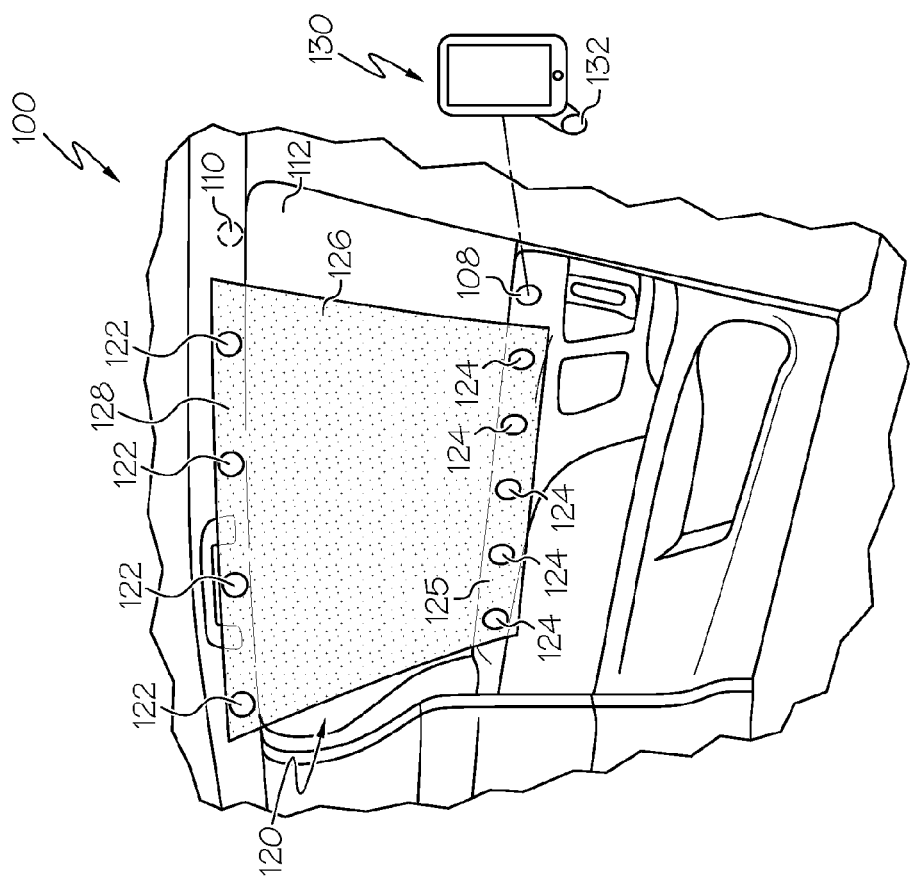
FIG. 2 depicts a perspective view of the trim assembly of FIG. 1 having a working subassembly installed thereon according to one or more embodiments shown and described herein.

Referring now to FIG. 2, the trim assembly 100 is illustrated having a working subassembly 120 mounted thereon. As used herein, the term "working subassembly" refers to any assembly that is used to perform an operation, such as covering the window 112 or holding a device, such as a mobile device (e.g., a cell phone, tablet, etc.). In the embodiment as illustrated in FIG. 2, the working subassembly 120 is a sun shade (or screen) mounted over the window 112. The working subassembly 120 includes a plurality of ferrous metal components 122, 124. It should be appreciated that the ferrous metal components 122, 124 may optionally be magnets. The working subassembly 120 includes a shade portion 126 extending between the edges 125, 128. The ferrous metal components 122, 124 are configured to connect to the edges 125, 128.

In other embodiments, the magnets 108, 110 may be an elongated strip of magnetic material, various sizes and magnetic strengths. Further, additional magnets, magnets spaced closer together, further apart . . . etc. may be provided to allow connection of the magnets 108, 110 to the working subassembly 120 depending, at least in part, on sizes and shapes of the working subassembly and trim assembly. Similarly, the working subassembly 120 may include ferrous metal components 122, 124 of an elongated configuration and/or made of various sizes and dimensions to accommodate the magnets 108, 110. Further, it should be appreciated that the magnets 108, 110 of the trim portions 104, 106 and the ferrous metal components 122, 124 of the working subassembly 120 may be reversed where the working subassembly 120 would have the magnets and the ferrous metal components would be mounted directly to the trim portions 104, 106 or combinations of magnets and ferrous metal components may be used.

Further illustrated in FIG. 2 is a mount 130 for a cell phone, tablet or other mobile device. In some embodiments, the mount 130 is configured to connect to a magnet 108 on the trim portion 104. In this embodiment, the mount 130 is a working subassembly as understood within the terms of the present specification. The mount 130 includes a ferrous component 132 configured to connect with the magnet 108.

Figure 3:
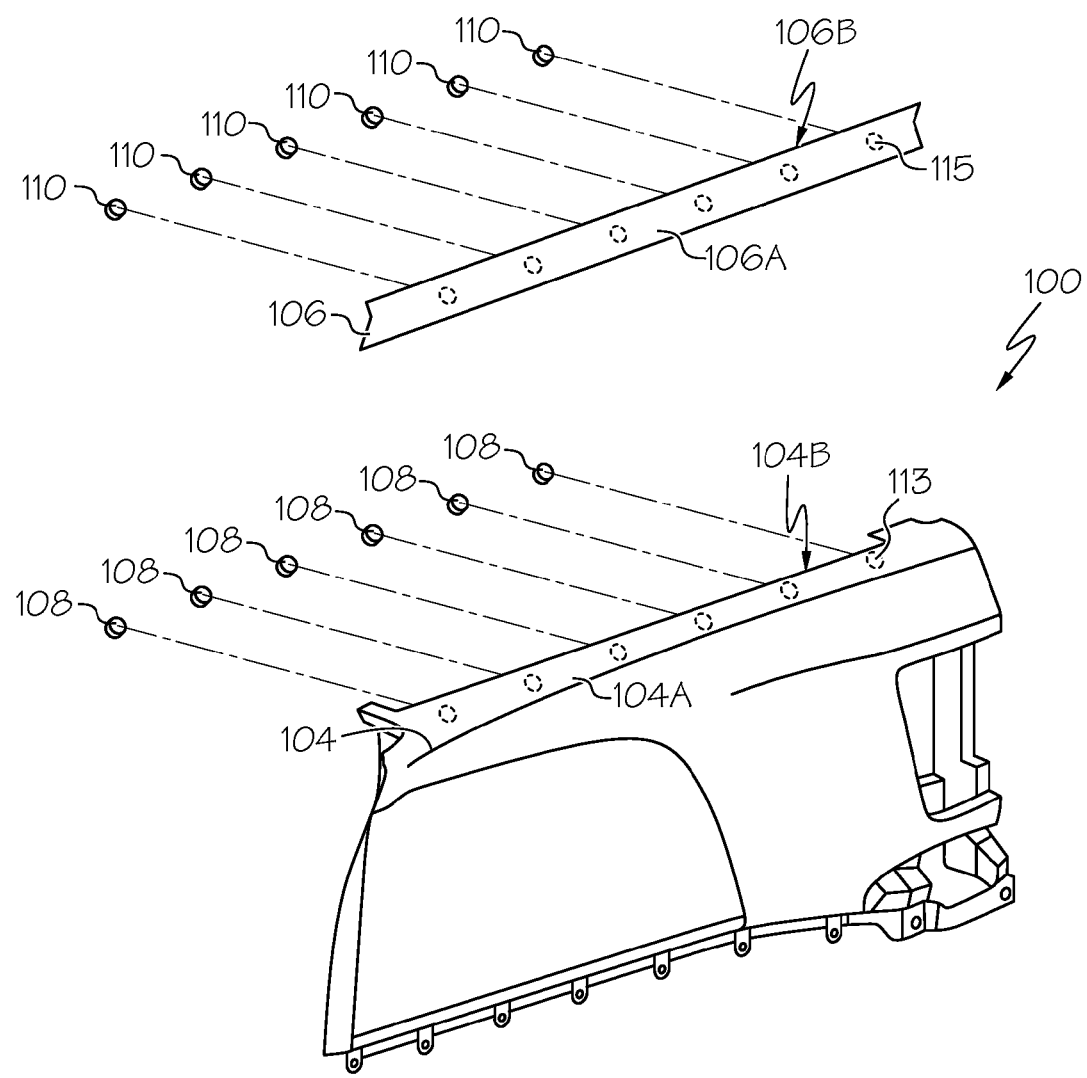
FIG. 3 illustrates an exploded perspective view of the trim assembly of FIG. 1 according to one or more embodiments shown and described herein.

Now referring to FIG. 3, a portion of the trim assembly 100 is illustrated in a partially exploded perspective view. The first trim portion 104 is illustrated having the plurality of magnets 108 mounted thereto. In the present embodiment, the magnets 108 are mounted to a second surface 104B of the first trim portion 104. The second surface 104B is opposite of the first surface 104A. A span of material from the first trim portion 104 spaces apart the first surface 104A from the second surface 104B.

FIG. 3 further illustrates the second trim portion 106. The second trim portion 106 is illustrated having the plurality of magnets 110 mounted thereto. In the present embodiment, the magnets 110 are mounted to a second surface 106B of the second trim portion 106. The second surface 106B is opposite of the first surface 106A. A span of material from the second trim portion 106 spaces apart the first surface 106A from the second surface 106B.

Figure 4:
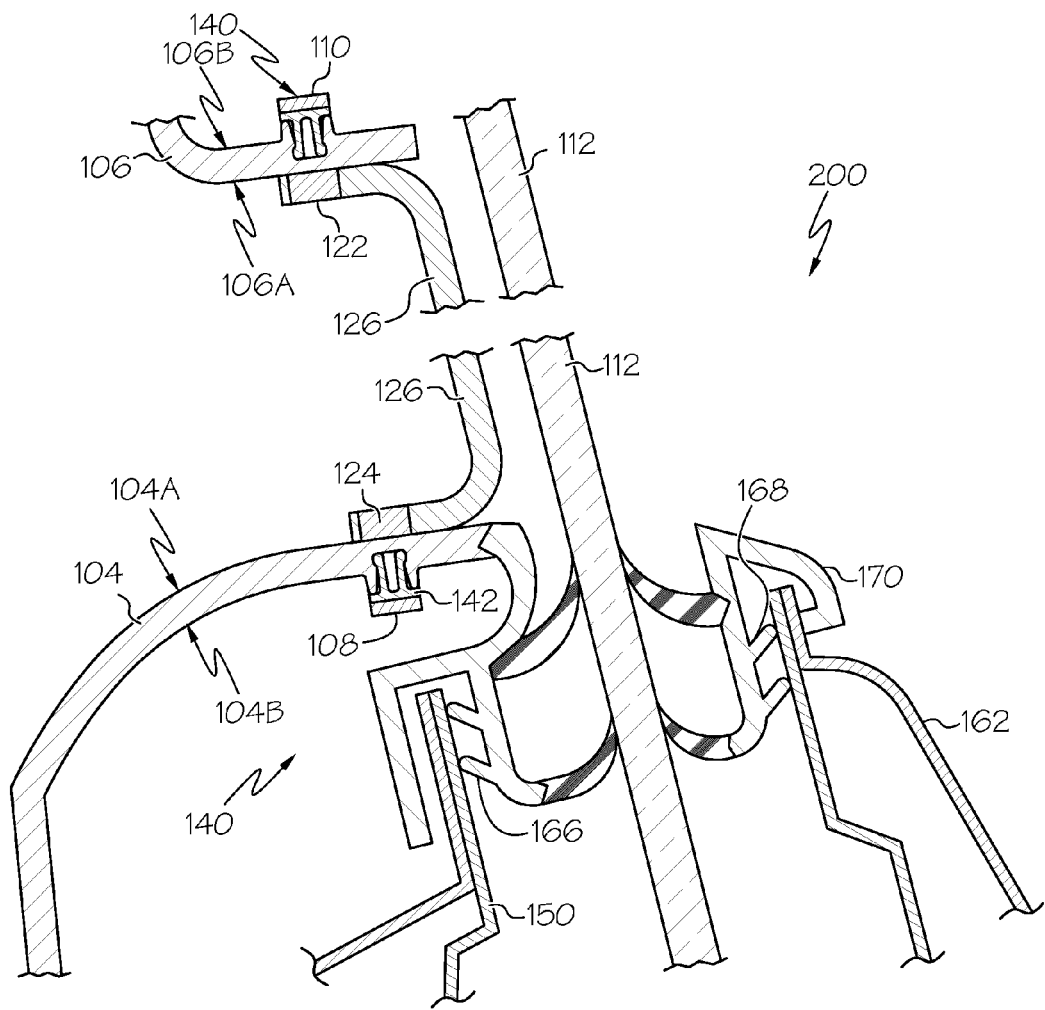
FIG. 4 illustrates a cross-sectional view of the trim assembly along line 4-4 of FIG. 2 according to one or more embodiments shown and described herein.
Figure 5:
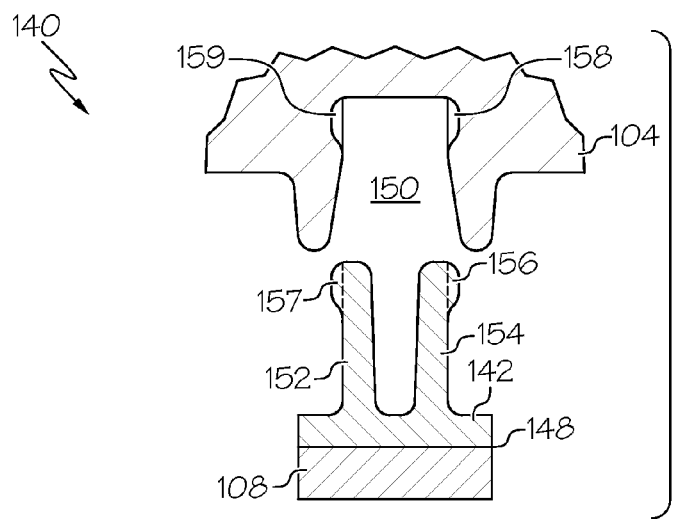
FIG. 5 illustrates a cross-sectional detail view of a connection of a magnet to a trim portion for use with the trim assembly of FIG. 1 according to one or more embodiments shown and described herein.

Now referring to FIGS. 4 and 5, an embodiment using a snap fit connection assembly 140 is illustrated. The snap fit connection 140 includes a connector 142 configured to connect to an indentation 150. The connector 142 includes the magnets 108, 110 mounted thereon. The magnets 108, 110 are connected to the connector 142 typically by means of an adhesive 148.

Other embodiments may include the magnets 108, 110 connecting to the connector 142 by a press fit connection, or other fastening system. The connector 142 includes prongs 152, 154 having protrusions 156, 157. The protrusions 156, 157 are configured to connect with the indentations 158, 159 within the indentation 150 in the first trim portion 104.

The connection assembly 140 is mounted to the first trim portion 104 and into the second trip portion 106 on the second surfaces 104B, 106B. The second surfaces 104B, 10B includes the indentation 150 extending into, but not through, the first trim portion 104 and the second trim portion 106.

The connector 142, in the present embodiment, includes a generally circular surface area to connect with the magnet 108. It should be appreciated that a plurality of connectors 142 and corresponding magnets 108, 110 may be provided connected to the trim portion for attachment of a working subassembly. The working subassembly 120 connects directly to the first surface 104A.

The first trim portion 104 and the second trip portion 106 are mounted adjacent to a window 112. The first trim portion 104 is further positioned adjacent to structural components 160, 162 and their connectors 166, 168, 170 when the trim assembly 100 is in a fully assembled configuration. A similar configuration of the trim portion 104 positioned adjacent to the structural components 160, 162 may be provided on the second trim portion 106. The working subassembly 126 extends between the first trim portion 104 and the second trim portion 106. The ferrous metal components 122, 124 of the working subassembly 126 connect to the magnets 108, 110 through the material of the first trim portion 104 and the second trim portion 106 thereby creating a secure connection between the working subassembly 126, the first trim portion 104 and the second trim portion 106.

Figure 6:
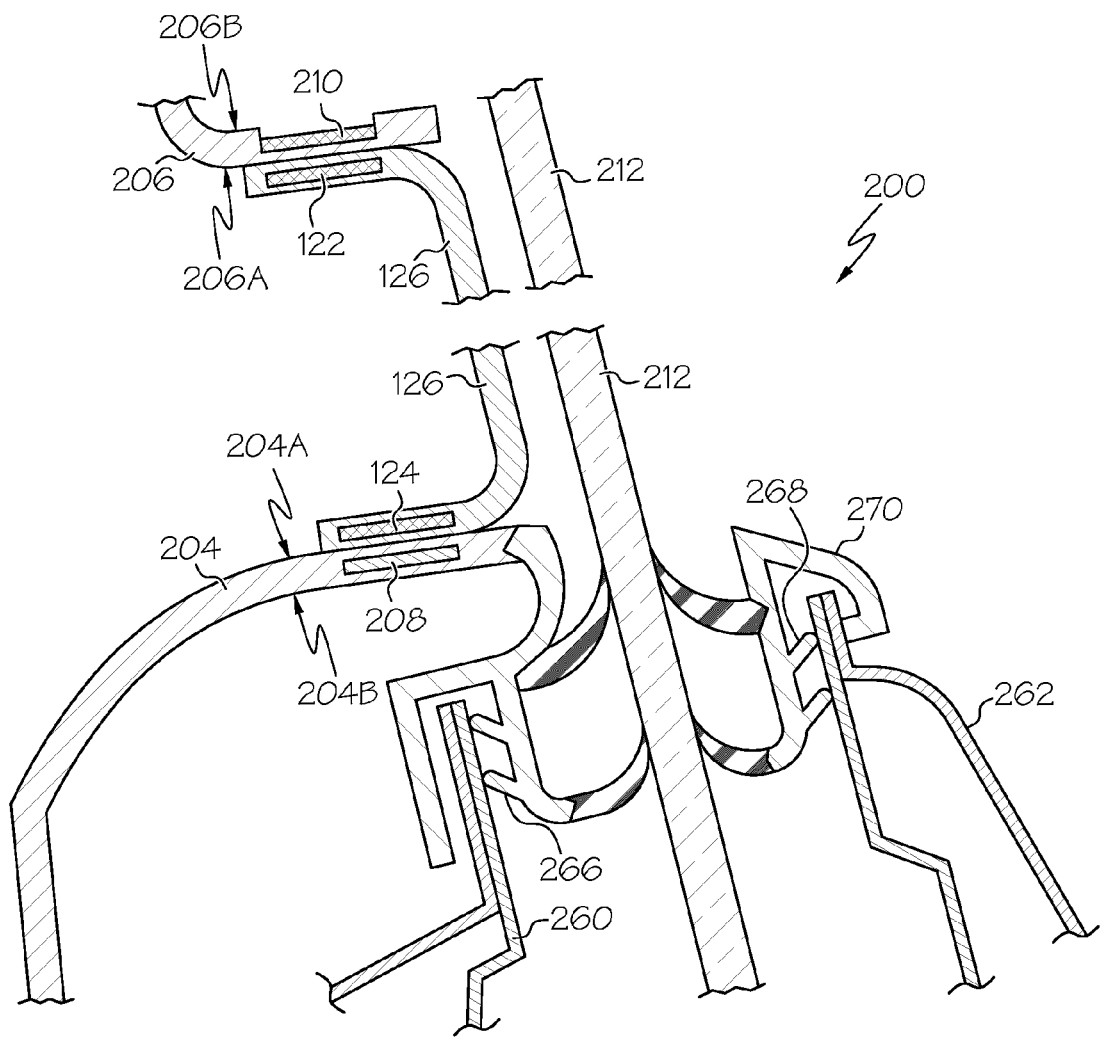
FIG. 6 illustrates a cross-sectional view of a trim portion of another trim assembly according to one or more embodiments shown and described herein.
Figure 7:
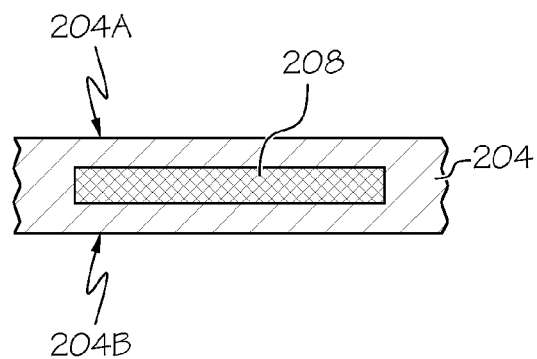
FIG. 7 illustrates a cross-sectional detail view of a section of the trim portion of FIG. 6 having a magnet mounted therein according to one or more embodiments shown and described herein.

Referring now to FIGS. 6 and 7, another trim assembly 200 includes a first trim portion 204 having a first surface 204A and an opposing second surface 204B. A second trim portion 206 is spaced apart from the first trim portion 204 and includes a first surface 206A and an opposing second surface 206B. A magnet 208 is molded within the first trim portion 204 and spaced between the first surface 204A and the second surface 204B. Furthermore, a magnet 210 is press fit within the second trim portion 206 and spaced between the first surface 206A and the second surface 206B. In other alternative embodiments, the magnet may be in a further recessed aperture on the second surface 204B or 206B. In the recess embodiment, the magnet 208, 210 may be connected to the trim portion 204, 206 by means of an adhesive or other suitable fastener.

The magnet 208 is molded into the first trim portion 204 during molding and forming of the first trim portion 204. In other embodiments using a press fit, the magnet 210 is inserted into a recess after molding of the first trim portion 206 and the second trim portion 206. The recess is subsequently filled with resulting in a smooth surface. Additional securing means may also be provide to secure the magnet if required (i.e. living hinges, caps . . . etc.)

The first trim portion 204 and the second trim portion 206 are mounted adjacent to a window 212. The first trim portion 204 is further positioned adjacent to structural components 260, 262 and their connectors 266, 268, 270 when the trim assembly 200 is in a fully assembled configuration. A similar configuration of the trim portion 204 positioned adjacent to the structural components 260, 262 may be provided on the second trim portion 206.

The working subassembly 126 extends between the first trim portion 204 and the second trim portion 206. The ferrous metal components 122, 124 of the working subassembly 126 connect to the magnets 208, 210 through the material of the first trim portion 204 and the second trim portion 206 thereby creating a secure connection between the working subassembly 126, the first trim portion 204 and the second trim portion 206.

Figure 8:
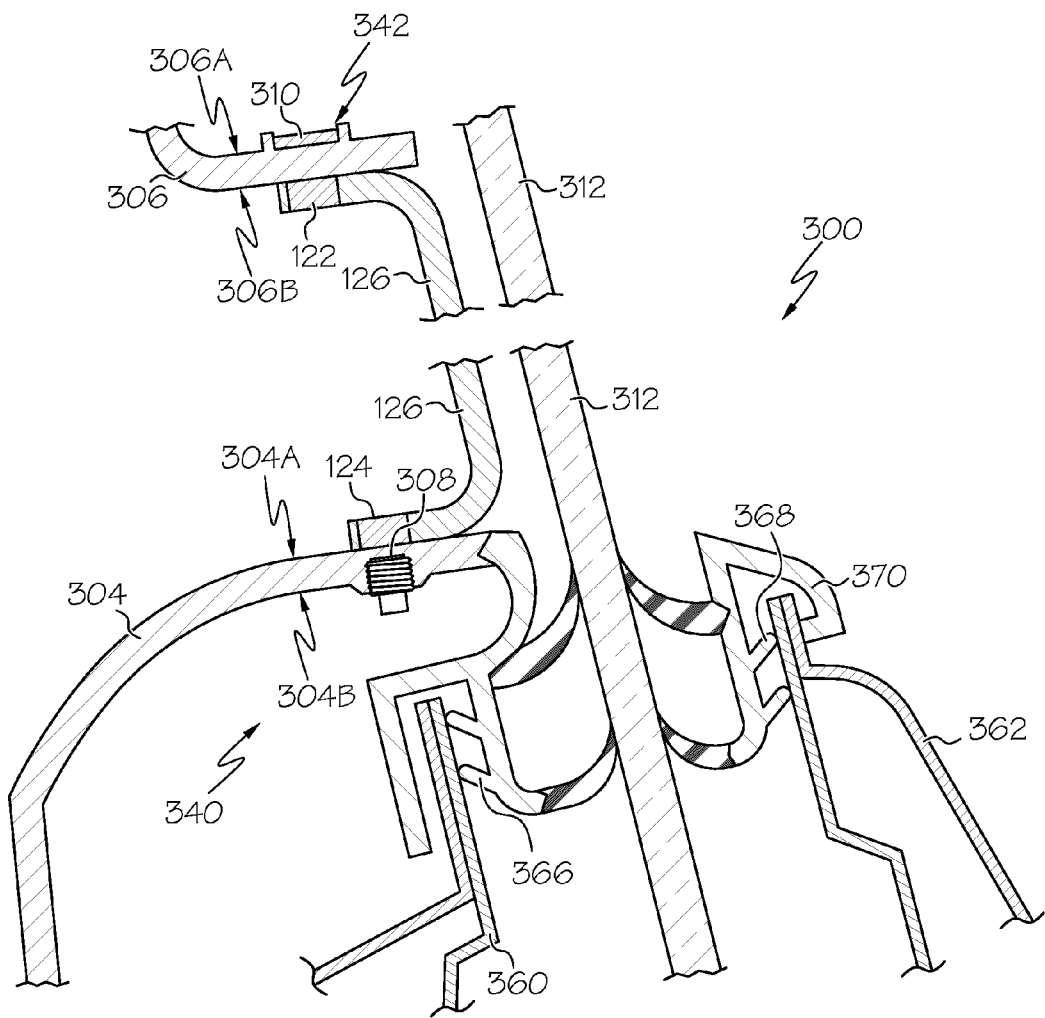
FIG. 8 illustrates a cross-sectional view of a trim portion of another trim assembly according to one or more embodiments shown and described herein.
Figure 9:
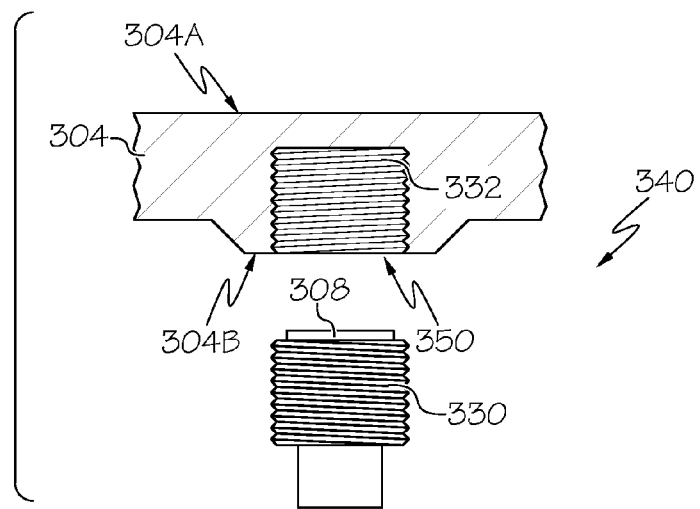
FIG. 9 illustrates a connector used to connect a magnet to the trim portion of the trim assembly of FIG. 8 according to one or more embodiments shown and described herein.

Now referring to FIGS. 8 and 9, another trim assembly 300 is provided having a first trim portion 304 and a second trim portion 306. The first trim portion 304 includes a first surface 304A and a second surface 304B. The first surface 304A is a surface as seen by the user within the vehicle. The second trim portion 306 includes a first surface 306A and a second surface 306B. The first surface 306A is a surface as seen by the user within the vehicle.

A connection subassembly 340 is provided having a magnet 308 contained within a threaded shaft 330. The threaded shaft 330 is configured to mount within the aperture 350 of the first trim portion 304 and the second trim portion 306. The aperture 350 includes the threaded inner surface 332. The threads of the connection subassembly 340 connect with the threads 332 of the aperture 350. The magnet 308 is then positioned close to but still behind the first surface 304A, 306A.

A connection assembly 342 is provided having a magnet 310 connected to the trim portion 306 in an alternative press fit configuration where two protrusions are provided. The magnet 310 is press fit into the trim portion 306 and magnetically connects with the magnet 122 of the working subassembly 126. Additional securing means may also be provide to secure the magnet if required (i.e. living hinges, caps . . . etc.)

In other embodiments, the magnet 308 itself includes a threaded portion. In this other embodiment, the threaded portion of the magnet 308 is configured to connect with the threaded inner surface 332 of the aperture 350.

The first trim portion 304 and the second trim portion 306 are mounted adjacent to a window 312. The first trim portion 304 is further positioned adjacent to structural components 360, 362 and their connectors 366, 368, 370 when the trim assembly 300 is in a fully assembled configuration. A similar configuration of the trim portion 304 positioned adjacent to the structural components 360, 362 may be provided on the second trim portion 306.

The working subassembly 126 extends between the first trim portion 304 and the second trim portion 306. The ferrous metal components 122, 124 of the working subassembly 126 connect to the magnets 308, 310 through the material of the first trim portion 304 and the second trim portion 306 thereby creating a secure connection between the working subassembly 126, the first trim portion 304 and the second trim portion 306.

Figure 10:
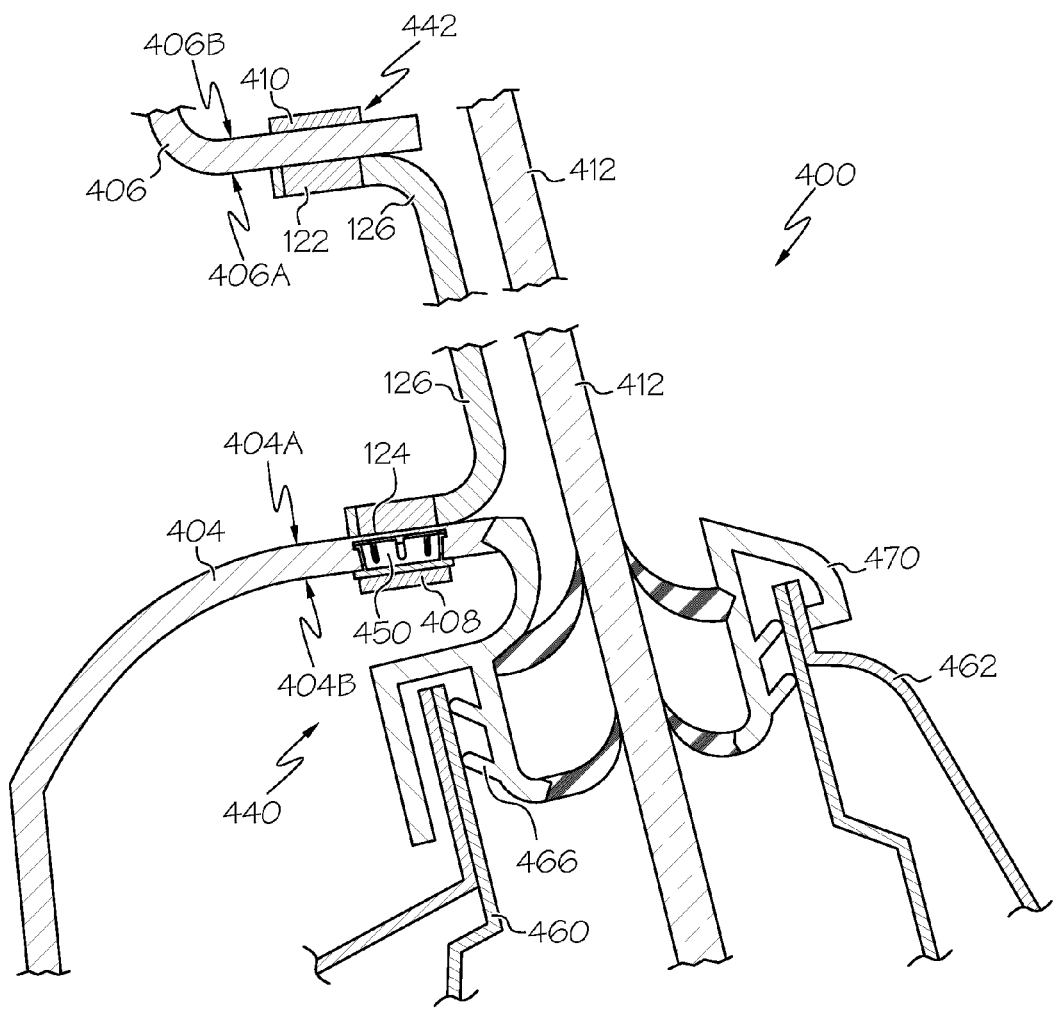
FIG. 10 illustrates a cross-sectional view of a trim portion of another trim assembly according to one or more embodiments shown and described herein.
Figure 11:
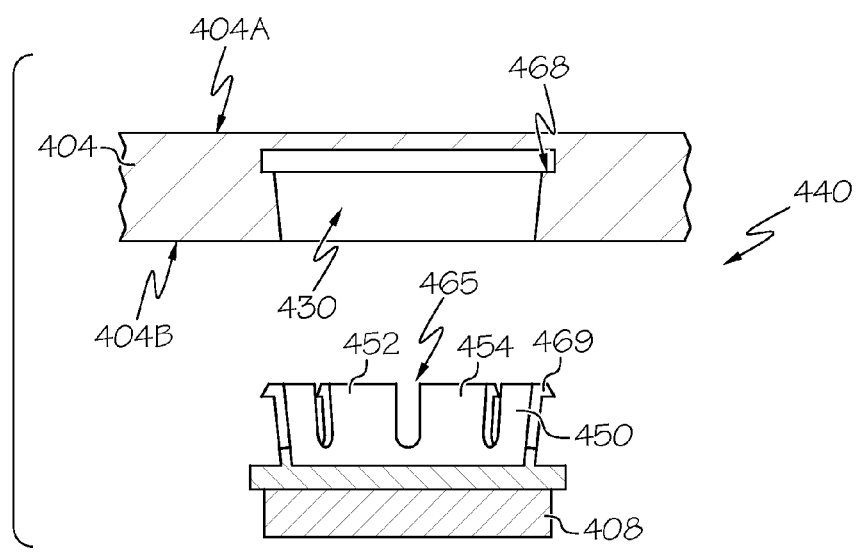
FIG. 11 depicts a cross-sectional detail view of a connector connecting a magnet to the trim portion of the trim assembly of FIG. 10 according to one or more embodiments shown and described herein.

Referring now to FIGS. 10 and 11, another trim assembly 400 is provided having a connection subassembly 440. The connection subassembly 440 includes a connector 450 having a plurality of arms 452, 454. The connection subassembly is mounted within the first trim portion 404 and the second trim portion 406. The first trim portion 404 includes a first surface 404A and a second opposing surface 404B. The second trim portion 406 includes a first surface 406A and a second surface 406B. The connection subassembly 440 mounts to the second surface 404B, 406B for the first and second trim portion 404, 406, respectively.

A connection assembly 442 is provided having a magnet 410. The magnet 410 is connected to the second surface 406B by means of an adhesive or other suitable connection. Additional securing means may also be provide to secure the magnet if required (i.e. living hinges, caps . . . etc.).

The connector 440 includes a magnet 408 mounted thereon. The connector 440 is configured to mount within the aperture 430 in a press fit or snap fit configuration. In the present embodiment, the connector 440 includes a generally circular surface which connects to the magnet 408, 410. The magnet 408, 410 is also generally curricular and dimensioned to connect to the connector 440. The connector 440 further includes protrusions 469. The protrusions 469 are configured to connect with and rest on the ledges 468 within the aperture 430. The ledges 468 facilitate a secure connection between the connector 440 and the trim portion 404.

In alternative embodiments, the magnet 408, 410 may be connected to a different area on the connector 440. By way of example, the magnet 408, 410 may connect to a center bore portion 465 of the connector 440. Even further, the connector 440 may be entirely made of a magnetic material (or ferrous metal material) thereby eliminating the need for attaching an auxiliary magnet.

The first trim portion 404 and the second trim portion 406 are mounted adjacent to a window 412. The first trim portion 404 is positioned adjacent to structural components 460, 462 and their connectors 466, 470 when the trim assembly 400 is in a fully assembled configuration. A similar configuration of the trim portion 404 positioned adjacent to the structural components 460, 462 may be provided on the second trim portion 406.

The working subassembly 126 extends between the first trim portion 404 and the second trim portion 406. The ferrous metal components 122, 124 of the working subassembly 126 connect to the magnets 408, 410 through the material of the first trim portion 404 and the second trim portion 406 thereby creating a secure connection between the working subassembly 126, the first trim portion 404 and the second trim portion 406.

In all of the embodiments described above, the magnets 108, 110, 208, 210, 308, 310, 408, 410 may alternatively be a ferrous metal configured to connect with an auxiliary magnet of a working subassembly. It should be appreciated that in all embodiments described above, the magnet may be substituted for a ferrous metal.

In all of the embodiments described above, the connector assemblies may be combined and used together depending on the vehicle requirements. For example, a molded magnet may be used on the first trim portion and a snap fit magnet may be used on the second trim portion . . . etc.

The connectors described above are typically all made of a plastic, plastic like, polymer, or polymer like material. In alternative embodiments, the connectors described above may be made of a metal or metallic material. The first trim portions 104, 204, 304, 404 and the second trim portions 106, 206, 306, 406 are typically made of a plastic, plastic like, polymer, or polymer like material so as to not interfere with the magnetic connection between the magnet and the working subassemblies. Alternatively, the trim portions 104, 106, 204, 206, 304, 306, 404, 406 may be made entirely of a nonferrous metal material.

In all of the embodiments described above, the magnets 108, 110, 208, 210, 308, 310, 408, 410 are configured to connect with ferrous metal components 122, 124 of a working subassembly 120. In the present embodiment, the working subassembly is a sun shade having a shade portion 126. The working subassembly may also be a mount 130 for mounting a mobile device thereto. If the user wants to install the working device 120 onto the trim portions 104, 106, the user simply places the ferrous metal components 122, 124 near the magnets 108, 110 to facilitate the magnetic connection between the magnets 108 and the ferrous metal components 124 (or between the magnets 110 and the ferrous metal components 122).

The magnets 108, 110, 208, 210, 308, 310, 408, 410 should be of sufficient strength to allow a magnetic connection between the surfaces. In certain circumstances, an electromagnet or other equally strong magnet may be utilized to encourage connection between the magnets and the ferrous metal components between the material of the trim portion.

The trim assembly provided herein allows for a user to swap out the working subassembly 120, 130 if the working subassembly is broken or if the user wishes to customize the working subassembly. The user may also use various working subassemblies such as animal cradles, storage components, or other similar working subassemblies thereby allowing the present trim assembly to be used in a significant amount of varying ways with various working subassemblies.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A trim assembly for a vehicle that is configured to mount a working subassembly, the trim assembly comprising:
    a first trim portion comprising a first surface that is visible from within the vehicle and an opposite second surface that is hidden from within the vehicle, a first magnet is connected to the second surface of the first trim portion so as to be hidden from within the vehicle; and
    a second trim portion spaced from the first trim portion, the second trim portion comprising a first surface that is visible from within the vehicle and an opposite second surface that is hidden from within the vehicle, a second magnet is connected to the second surface of the second trim portion so as to be hidden from within the vehicle;
    wherein the working subassembly is configured to span between the first trim portion and the second trim portion, the working subassembly magnetically connectable to the respective first and second magnets.

2. The trim assembly of claim 1 wherein the working subassembly is a screen, the screen having at least two metal or magnetic connectors in communication with the first and second magnets.

3. The trim assembly of claim 2 wherein the screen is configured to cover a window to block the sun from entering a vehicle.

4. The trim assembly of claim 1 wherein at least one of the first magnet or the second magnet are connected to the trim portions using an adhesive.

5. The trim assembly of claim 1 wherein the first trim portion and the second trim portion each include indicia to indicate where the first magnet and the second magnet are located so as to assist in installing the working subassembly.

6. The trim assembly of claim 1 wherein the first magnet and the second magnet are connected to respective first and second inside surfaces of the respective first and second trim portions.

7. The trim assembly of claim 6 wherein first and second magnets are connected to the respective first and second inside surfaces of the respective first and second trim portions using a snap fit connector.

8. The trim assembly of claim 6 wherein first and second magnets are connected to the respective first and second trim portions by molding the magnets into the first and second trim portions.

9. The trim assembly of claim 6 wherein first and second magnets are connected to the respective first and second inside surfaces of the respective first and second trim portions using a threaded connection.

10. The trim assembly of claim 6 wherein first and second magnets are connected to the respective first and second inside surfaces of the respective first and second trim portions using push on connector.

11. The trim assembly of claim 1 wherein the first or the second magnets are connected to the first or second trim portions by means of a press fit connection.

12. A trim assembly for a vehicle configured to mount a working subassembly, the trim assembly comprising:
    a trim portion having an outer surface, a magnet or a ferrous metal component connected to the trim portion so as to be hidden when the user views the outer surface;
    the working subassembly magnetically connectable through the outer surface to the other of the magnet or the ferrous metal component thereby mounting the working subassembly to the trim portion.

13. The trim assembly of claim 12 wherein the working subassembly is a mount for a mobile device, the mount having the other of the magnet or the ferrous metal component mounted thereto configured to connect with the magnet or the ferrous metal component of the trim portion.

14. The trim assembly of claim 12 wherein the working subassembly is a screen is configured to cover a window to block the sun from entering a vehicle, the screen having the other of the magnet or the ferrous metal component mounted thereto configured to connect with the magnet or the ferrous metal component of the trim portion.

15. A trim assembly for a vehicle configured to mount a working subassembly, the trim assembly comprising:
   a first trim portion comprising a first surface that is visible from within the vehicle and an opposite second surface that is hidden from within the vehicle, a first ferrous metal component is connected to the second surface of the first trim portion so as to be hidden from within the vehicle; and
   a second trim portion spaced from the first trim portion, the second trim portion comprising a first surface that is visible from within the vehicle and an opposite second surface that is hidden from within the vehicle, a second ferrous metal component is connected to the second surface of the second trim portion so as to be hidden from within the vehicle;
   wherein the working subassembly is configured to span between the first trim portion and the second trim portion, the working subassembly magnetically connectable to the respective first and second ferrous metal components.

16. The trim assembly of claim 15 wherein the first trim portion and the second trim portion each include indicia to indicate where the first magnet and the second magnet are located so as to assist in installing the working subassembly.

17. The trim assembly of claim 15 wherein at least one of the first and second magnets are connected to the respective first and second trim portions using a snap fit connector.

18. The trim assembly of claim 15 wherein first and second magnets are connected to the respective first and second trim portions by molding the magnets into the first and second trim portions.

19. The trim assembly of claim 15 wherein first and second magnets are connected to the respective first and second trim portions using a threaded connection.

20. The trim assembly of claim 15 wherein first and second magnets are connected to the respective first and second trim portions using a push on connector.

* * * * *